United States Patent [19]

Morita

[11] Patent Number: 4,572,321
[45] Date of Patent: Feb. 25, 1986

[54] ENGINE-MOUNTING STRUCTURE

[75] Inventor: Isamu Morita, Asaka, Japan

[73] Assignee: Honda Giken Kogyo Kabushiki Kaisha, Tokyo, Japan

[21] Appl. No.: 357,325

[22] Filed: Mar. 11, 1982

[30] Foreign Application Priority Data

Mar. 11, 1981 [JP] Japan .................................. 56-35010

[51] Int. Cl.$^4$ .............................................. B60K 5/04
[52] U.S. Cl. .................................. 180/297; 180/300; 180/312
[58] Field of Search ............... 180/297, 299, 300, 312, 180/902; 250/104, 709; 248/638; 267/140.1, 141.1, 124; 188/266, 272

[56] References Cited

U.S. PATENT DOCUMENTS

| | | | |
|---|---|---|---|
| 3,820,812 | 6/1974 | Stubbs | 280/709 |
| 3,958,654 | 5/1976 | LeSalver | 180/902 |
| 4,047,588 | 9/1977 | Blass | 180/297 |
| 4,194,731 | 3/1980 | Marx | 267/124 |

FOREIGN PATENT DOCUMENTS

| | | | |
|---|---|---|---|
| 40164 | 4/1978 | Japan | 267/140.1 |
| 54-25022 | 2/1979 | Japan | 180/300 |
| 146421 | 11/1981 | Japan | 180/300 |

Primary Examiner—Joseph F. Peters, Jr.
Assistant Examiner—Joseph G. McCarthy
Attorney, Agent, or Firm—Armstrong, Nikaido, Marmelstein & Kubovcik

[57] ABSTRACT

A structure including two brackets extending from the engine casing in opposite directions normal to the axis of aligned output shafts of the engine, two pairs of variable-volume supporting units bearing against the top and bottom surfaces of the adjacent one of the two engine brackets, and a control valve arranged normally to interconnect the upper and lower supporting units in one pair with the lower and upper ones in the other pair, respectively. The two pairs of supporting units so interconnected exhibit an overall spring constant the magnitude of which is reduced upon vertical vibration of the engine and raised upon angular displacement thereof about the axis of the aligned output shafts so that such vibration and angular displacement can be effectively suppressed.

1 Claim, 2 Drawing Figures

ENGINE-MOUNTING STRUCTURE

BACKGROUND OF THE INVENTION

1. Field of the Invention

This invention relates generally to engine mounting structures usable on the body of an automotive vehicle and more particularly to those of the type designed particularly to accommodate and/or suppressing vertical vibration and angular displacement of the engine.

2. Description of the Prior Art

Movements usually caused to the engine on the vehicle against the engine mounting structure are divided into two categories, one including vertical vibrations occurring during idling and normal operation of the engine and the other including angular displacements about the axis of the engine output shaft. Under this situation, the engine mounting structure needs to meet conflicting requirements in relation to its spring constant. Specifically, as for vertical vibrations, the spring constant of the engine mounting structure is required to be set at a rather low level in order to effectively accommodate such vibrations. On the other hand, in order to suppress angular displacements of the engine to any effective manner, the spring constant of the engine mounting structure is required to be selected at a higher level because of the very large moment of inertia of the engine unit.

SUMMARY OF THE INVENTION

Under the circumstances, the present invention has for its object the provision of a new and improved engine mounting structure of the type described, which is capable of meeting such conflicting requirements as described above and is simple in construction and efficient in operation.

To attain the objective, there is provided an engine mounting structure which comprises a first and a second bracket extending from the engine casing in opposite directions at right angles to the axis of the output shaft of the engine, a first pair of upper and lower supporting units bearing against the top and bottom surfaces of said first bracket and each including a fluid-filled variable-volume chamber, a second pair of upper and lower supporting units bearing against the top and bottom surfaces of said second bracket and each including a fluid-filled variable-volume chamber, and a control valve adapted to place the variable-volume chamber in the upper supporting unit in the first pair in fluid communication with the one in the lower supporting unit in the second pair and to place the variable-volume chamber in the lower supporting unit in the first pair in fluid communication with the one in the upper supporting unit in the second pair.

The foregoing and other objects, features and advantages of the present invention will become apparent from the following description when taken in conjunction with the accompanying drawings.

DESCRIPTION OF THE PREFERRED EMBODIMENT

Figure 1:
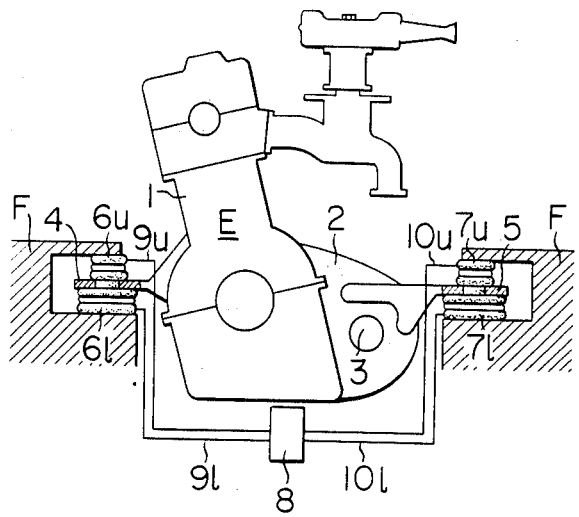
FIG. 1 is a side elevational view of an engine mounting structure embodying the principles of the invention.

Description will now be made of a preferred embodiment illustrated in the drawings.

Referring first to FIG. 1, reference character E indicates an automotive engine which includes a slightly forwardly tilted engine casing or block 1 and a transmission assembly connected to the rear thereof. A pair of right and left output shafts 3 are provided on the transmission assembly 2 for driving the front wheels, not shown, of the automotive vehicle. Provided on the opposite sides of the common axis of output shafts 3 are a first and a second bracket 4 and 5 which extend forwardly and rearwardly, respectively, from the front and rear sides of the engine E. The first bracket 4 is supported on the body frame F of the vehicle by means of a first pair of upper and lower supporting units $6u$ and $6l$ of the variable-volume type, which are arranged to bear against the top and bottom surfaces of the first bracket 4, each including a fluid-filled variable-volume chamber. Similarly, the second bracket 5 is supported on the vehicle frame F by means of a second pair of upper and lower variable-volume type supporting units $7u$ and $7l$, arranged to bear against the top and bottom surfaces of the second bracket 5. As shown, the first and second pairs of upper and lower supporting units $6u$–$6l$ and $7u$–$7l$ are fitted in a pair of opposed pockets formed in the vehicle frame F, with the first and second brackets 4 and 5 held between the respective paired supporting units.

As clearly seen in FIG. 2, the variable-volume type supporting units $6u$–$6l$ and $7u$–$7l$ in the first and second pairs are each formed of a bellows closed at its top and bottom except for appropriate passage means and optional orifice means described below and filled with an appropriate fluid, i.e., with a liquid, a gas or a mixture thereof. In each pair of upper and lower supporting units $6u$–$6l$ or $7u$–$7l$, the upper supporting units $6u$ or $7u$ is smaller in diameter than the lower one $6l$ or $7l$.

A control valve 8 is arranged between the first pair of supporting units $6u$–$6l$ and the second pair of supporting units $7u$–$7l$. Extending from the supporting units $6u$–$6l$ and $7u$–$7l$ are fluid passages $9u$–$9l$ and $10u$–$10l$ which are connected to the control valve 8. As illustrated diagrammatically in FIG. 2, the control valve 8 is normally positioned to connect the fluid passage $9u$ extending from the upper supporting unit $6u$ in the first pair of supporting units with the fluid passage $10l$ extending from the lower supporting unit $7l$ in the second pair and to connect the fluid passage $9l$ extending from lower supporting unit $6l$ in the first pair with the fluid passage $10u$ extending from upper supporting unit in the second pair.

With the control valve 8 held in its normal, interconnecting position, as described above, it is to be noted that, when the engine E vibrates vertically as in idling or in the normal steady state of engine operation, compressive forces are exerted alternately upon the upper supporting units $6u$, $7u$ and the lower ones $6l$, $7l$ through the intermediary of the first and second brackets 4 and 5 to cause reciprocatory fluid movements between the upper supporting unit $6u$ in the first pair of supporting units and the lower supporting unit $7l$ in the second pair and between the lower supporting unit $6l$ in the first pair and the upper supporting unit $7u$ in the second pair. In this situation, the effective pressure-bearing area $A_1$ of each of the first and second pairs of supporting units $6u$–$6l$ and $7u$–$7l$ can be expressed as follows:

$$A_1 = \frac{\pi}{4}(D_l^2 - D_u^2)$$

where $D_l$ is the effective diameter of lower supporting units $6l$ and $7l$ and $D_u$, the effective diameter of upper supporting units $6u$ and $7u$.

As apparent from this formula, the effective pressure-bearing area of the first pair of supporting units, $6u$–$6l$, and of the second pair of supporting units, $7u$–$7l$, during vertical vibration of the engine, is relatively small in value and equal to the difference between the effective pressure-bearing area of upper supporting unit $6u$ or $7u$ and that of lower supporting unit $6l$ or $7l$. In this manner, both the first and second pairs of supporting units $6u$–$6l$ and $7u$–$7l$ exhibit an overall spring constant reduced enough to accommodate the vertical vibration of engine E in an effective manner.

Figure 2:
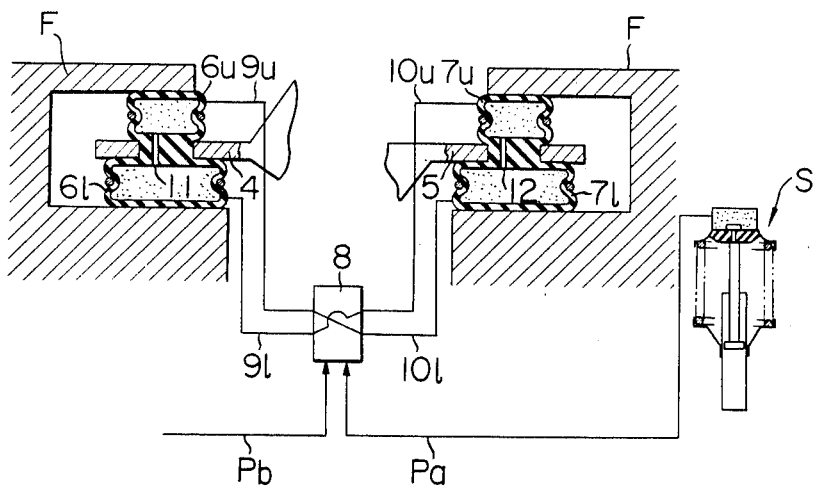
FIG. 2 is an enlarged side elevation, in cross section, showing the essential parts of same.

On the other hand, when the engine E in operation is suddenly accelerated or decelerated to tend to turn about the axis of its output shafts 3, for example, in a clockwise direction, as viewed in FIG. 2, the upper supporting unit $6u$ in the first pair of supporting units and the lower supporting unit $7l$ in the second pair, which are in fluid communication with each other, are both subjected to compressive load by way of the respective brackets 4 and 5 and there arises no fluid flow between the two interconnected supporting units $6u$ and $7l$. It will be apparent that substantially the same holds the other set of interconnected supporting units $6l$ and $7u$. In this case, therefore, the effective pressure-bearing area of the first and second pairs of supporting units $6u$–$6l$ and $7u$–$7l$ can be expressed by the following formula:

$$A_2 = \frac{\pi}{4}(D_l^2 + D_u^2)$$

In other words, the effective pressure-bearing area $A_2$ of each of the first and second pairs of supporting units $6u$–$6l$ and $7u$–$7l$ when the engine E is displaced angularly about the axis of output shafts 3 is relatively large in value, corresponding to the sum of the effective pressure-bearing area of upper supporting unit $6u$ or $7u$ and that of lower supporting unit $6l$ or $7l$. This means that in this case both the first and second pairs of supporting units $6u$–$6l$ and $7u$–$7l$ exhibit an overall spring constant high enough to suppress the angular displacement of the engine E.

According to an additional feature of the present invention, the upper and lower supporting units $6u$–$6l$ or $7u$–$7l$ in each pair may be connected with each other by an appropriate orifice means 11 or 12 to adjust the cushioning characteristic of the pair of supporting units. To enable the engine E to assist in suppressing vibrations of the vehicle body as deriving from irregularities of the road surface, the control valve 8 may be arranged to act to control the fluid pressure in the supporting units $6u$–$6l$ and $7u$–$7l$ upon reception of a signal Pa from a wheel suspension S of the vehicle when travelling over a rough road. The control valve 8 may also be arranged to act in response to an acceleration or deceleration signal from the engine E to control the fluid pressure in the supporting units $6u$–$6l$ and $7u$–$7l$ thereby to control the amount of angular displacement of the engine according to the magnitude of engine acceleration or deceleration.

It will be readily appreciated from the foregoing description that the engine mounting structure of the present invention is not only simple in construction but also is highly effective to accommodate or suppress vibrations and angular displacement of the engine in operation as the overall spring constant of the first and second pairs of variable-volume supporting units arranged in fluid communication as specified is automatically reduced upon vertical vibration of the engine and raised upon angular displacement thereof about the engine output axis.

What is claimed is:

1. An engine mounting structure comprising a first and a second bracket extending from the engine casing in opposite directions at right angles to the output shaft of the engine, a first pair of upper and lower supporting units bearing against the upper and lower surfaces of said first bracket and each including a fluid-filled variable-volume chamber, and a second pair of upper and lower supporting units bearing against the upper and lower surfaces of said second bracket and each including a fluid-filled variable-volume chamber, said respective first and second pairs of upper and lower supporting units being clampingly held by a vehicle body from upper and lower sides thereof, wherein said variable-volume chamber in the upper supporting unit in said first pair is placed in fluid communication with the one in the lower supporting unit in said second pair via first passage means; said variable-volume chamber in the lower supporting unit in said first pair is placed in fluid communication with the one in the upper supporting unit in said second pair via second passage means; the lower supporting units in said first and second pairs have larger, effective pressure-bearing areas than the upper supporting units of the first and second pairs, respectively; the variable-volume chambers in the upper and lower support units in each of said first and second pairs of said supporting units are in fluid communication with each other by orifice means; and said upper and lower supporting units in said first and second pairs are each formed of bellows having its top and bottom closed excluding openings thereof leading to said first and second passage means and to said orifice means.

* * * * *